United States Patent
Chen et al.

(10) Patent No.: US 12,269,067 B2
(45) Date of Patent: Apr. 8, 2025

(54) ITEM SORTING APPARATUS AND INTERFACES THEREFOR

(71) Applicant: Recology Inc., San Francisco, CA (US)

(72) Inventors: Cary Chen, San Francisco, CA (US); Maurice Quillen, San Francisco, CA (US); Daniel Shea, San Francisco, CA (US)

(73) Assignee: Recology Inc., San Francisco, CA (US)

( * ) Notice: Subject to any disclaimer, the term of this patent is extended or adjusted under 35 U.S.C. 154(b) by 0 days.

(21) Appl. No.: 18/615,978

(22) Filed: Mar. 25, 2024

(65) Prior Publication Data

US 2024/0326098 A1    Oct. 3, 2024

Related U.S. Application Data

(60) Provisional application No. 63/455,937, filed on Mar. 30, 2023.

(51) Int. Cl.
*B07C 5/342*      (2006.01)
*G06V 10/70*     (2022.01)

(52) U.S. Cl.
CPC ............ *B07C 5/3422* (2013.01); *G06V 10/70* (2022.01); *B07C 2501/0072* (2013.01)

(58) Field of Classification Search
CPC .............................. B07C 5/342; B07C 5/3422
USPC ........................................................... 209/577
See application file for complete search history.

(56) References Cited

U.S. PATENT DOCUMENTS

2024/0326098 A1 *  10/2024  Chen ...................... B07C 5/342

FOREIGN PATENT DOCUMENTS

| CN | 101770342 A | * | 7/2010 | ......... G06F 3/04855 |
| CN | 102655951 B | * | 2/2014 | ........... B07C 5/3422 |
| EP | 3610843 A1 | * | 2/2020 | ................ A61J 1/03 |

* cited by examiner

*Primary Examiner* — Terrell H Matthews
(74) *Attorney, Agent, or Firm* — DLA Piper LLP (US)

(57) ABSTRACT

Systems and methods are described for generating an interface that allows users to select and categorize particular waste items in real-time, for subsequent automated sorting. For example, detecting and identifying waste items, presenting them on a display, and allowing users to select items from the display and categorize them by selecting and dragging highlighted items to appropriate category affordances presented on the display.

15 Claims, 8 Drawing Sheets

ITEM SORTING APPARATUS AND INTERFACES THEREFOR

CROSS-REFERENCE TO RELATED APPLICATIONS

This application claims priority to the following provisional application: U.S. Provisional Patent Application Ser. No. 63/455,937, entitled "ITEM SORTING APPARATUS AND INTERFACES THEREFOR", filed Mar. 30, 2023, the contents of which is hereby incorporated by reference in its entirety for all purposes.

FIELD

The present disclosure relates generally to item sorting mechanisms. More specifically, the present disclosure relates to item sorting apparatuses and interfaces therefor.

BACKGROUND

Contemporary item sorting systems and methods present a number of significant challenges. At one end of the spectrum, item sorting has historically been accomplished by manual identification and sorting of items, for example employing people to manually select and sort items. This approach, however, is limited by the speed at which humans may identify and sort items, and entails many of the risks commonly associated with manual sorting, such as potential exposure to toxins, sharp objects, moving machinery, and other dangers that may be presented by the items and/or machinery. Long-term use of people in this role also poses challenges such as the risk of repetitive stress injuries. At the other end of the spectrum, systems for large-scale sorting of waste items, such as those employed at waste management sites to sort consumer waste into bins or categories such as plastics of various types, cardboard and paper, recyclable metals, and the like, are capable of processing large amounts of waste automatically, with little to no human intervention in the sorting process. Such systems often use optical sensors to identify waste items, and picking mechanisms to move the identified items to appropriate bins for processing. Item identification is often inaccurate, however, with automatic identification methods commonly unable to recognize unusual items, or items that have been discolored, dirtied, crushed, warped, or otherwise deformed into difficult-to-recognize shapes. Accordingly, efforts have been directed towards overcoming the challenges presented at each end of the above spectrum, to generate more accurate and safer sorting systems.

SUMMARY

In some embodiments of the disclosure, systems and methods are described for generating an interface that allows users to select and categorize particular waste items in real-time, for subsequent automated sorting. Systems and methods of embodiments of the disclosure detect and identify waste items, presenting them on a display and allowing users to select items from the display and categorize them such as by selecting and dragging highlighted items to appropriate category affordances presented on the display. Human identification of items has proven more accurate and reliable than conventional machine learning or other automated approaches, and systems of embodiments of the disclosure allow for humans to perform item identification and sorting in an easy and reliable manner. Embodiments of the disclosure thus allow users to manually categorize items in convenient and rapid manner, yielding a system that permits high volume item identification and sorting in a manner that is more accurate and reliable than conventional fully automated systems.

In some embodiments of the disclosure, a method is described, comprising receiving an image of a plurality of items and transmitting the image for display on an electronic device, the display including the image and a visual representation of each of one or more item categories. The method further comprises receiving, from the electronic device, a selection of one of the image portions and a selection of one of the item categories, and transmitting an instruction to sort the item corresponding to the selected one of the image portions into a repository of items of the selected item category.

In some other embodiments of the disclosure, a method is described comprising, at an electronic device with a display, receiving an image of a plurality of items, and displaying the image and a visual representation of each of one or more item categories, portions of the image representing the items being selectable by a user of the electronic device. The method further comprises detecting, on the display, a first input corresponding to a selection of one of the items, and detecting, on the display, a second input corresponding to a selection of one of the item categories for the selected one of the items. The method may further comprise transmitting an instruction to sort the selected one of the items into a repository of items of the selected one of the item categories.

In some other embodiments of the disclosure, a method is described, comprising identifying an item according to a beam of light directed thereon from a light source, determining a category of the identified item from an identifier of the light source, and transmitting an instruction to sort the identified item into a repository of items of the selected one of the object categories.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Certain details are set forth below to provide a sufficient understanding of various embodiments of the disclosure. However, it will be clear to one skilled in the art that embodiments of the disclosure may be practiced without one or more of these particular details, or with other details. Moreover, the particular embodiments of the present disclosure described herein are provided by way of example and should not be used to limit the scope of the disclosure to these particular embodiments. In other instances, hardware components, network architectures, and/or software operations have not been shown in detail in order to avoid unnecessarily obscuring the disclosure.

In some embodiments of the disclosure, systems and methods are described for generating an interface allowing users to select and categorize items such as in real-time, for subsequent sorting. Systems and methods of embodiments of the disclosure detect a collection of items and identify particular ones of the items, presenting them on a display and highlighting these items for user selection and categorization. Users are permitted to select items shown on the display, including highlighted items, and categorize them such as by dragging selected items to appropriate category affordances presented on the display or selecting appropriate category affordances. In this manner, embodiments of the disclosure provide an interface allowing users to categorize items in convenient and rapid manner, providing for item categorization that is conveniently performed by a user, yet utilizes human judgment and is thus often more accurate than conventional automated sorting machines.

In some embodiments, this interface can be implemented on a computing device with a touch-sensitive display, to allow users to select and categorize items. In some embodiments, the interface can be used in conjunction with any other automated item categorization system. For example, embodiments of the disclosure can allow users to manually correct mis-categorizations and other errors produced by an automated item categorization system. Interfaces of embodiments of the disclosure may highlight or otherwise display item categorizations determined by the automated item categorization system, and allow users, via a user interface, to re-categorize the items and correct errors or omissions in the automated system. Accordingly, embodiments of the disclosure provide a system for complementing automated item categorization systems with human user interface-based correction that occurs remotely, thus providing the benefit of human judgment and accuracy to automated sorting systems without presenting the risks to humans entailed by fully manual sorting.

Figure 1A:
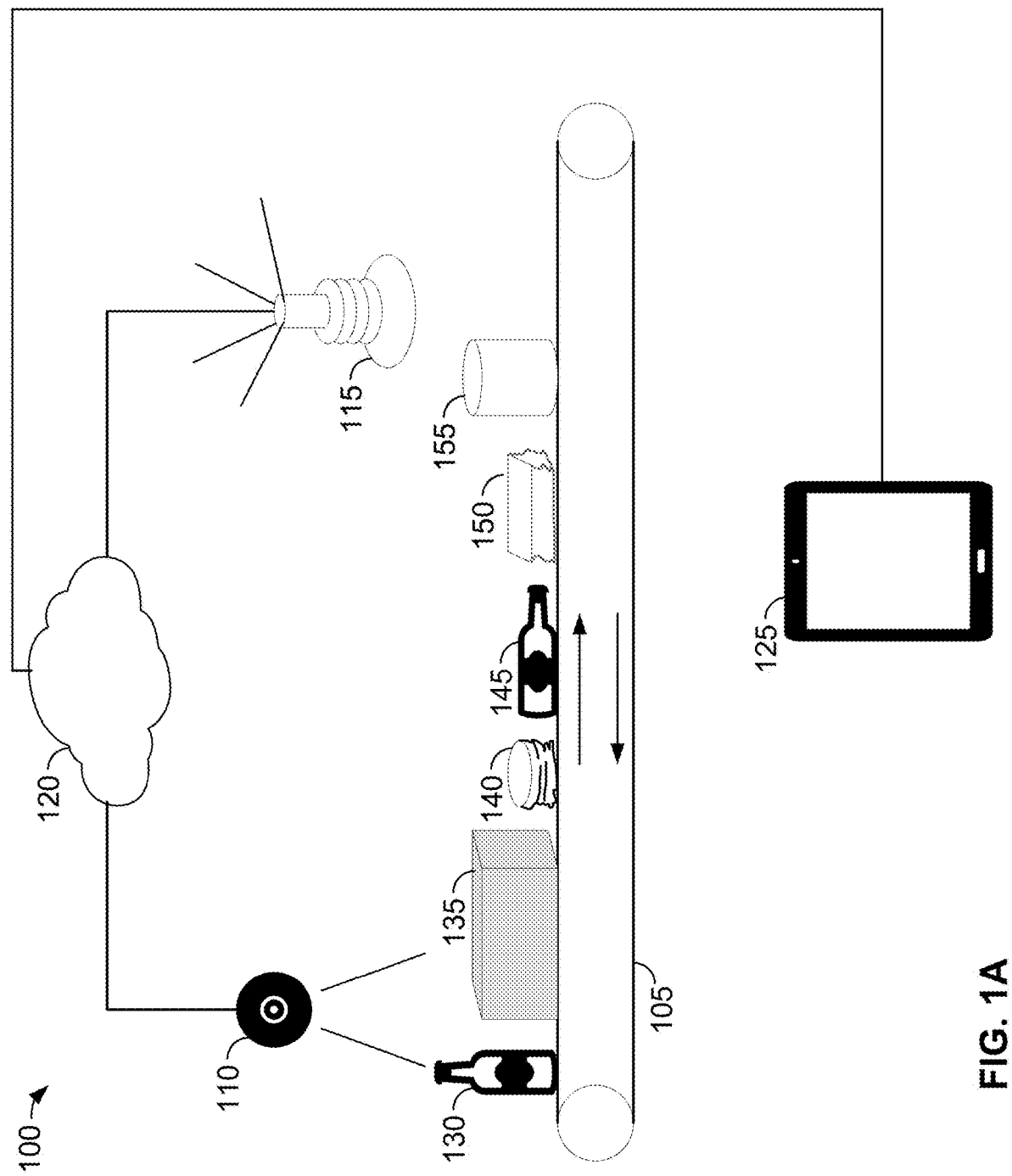
FIG. 1A is a diagram conceptually illustrating an exemplary system for selection and categorization of items, according to embodiments of the disclosure.

FIG. 1A is a diagram conceptually illustrating an exemplary system for selection and categorization of items, according to embodiments of the disclosure. Here, an item sorting system 100 includes one or more sensors 110, one or more item manipulation mechanisms 115, and at least one computing device 125. Each sensor 110 may be any sensing device capable of detecting the presence and any desired characteristics of any objects such as objects 130-155, such as one or more of a visible light camera, infrared camera or a camera configured to detect radiation of any frequency of interest, a motion detection sensor, or the like. In embodiments of the disclosure, cameras may be any still or video camera. Item manipulation mechanisms 115 may be any one or more mechanisms for moving any detected objects 130-155 to or toward any desired location, such as a gripping or picking mechanism that physically couples to an object 130-155 and moves it to a desired location, a blowing mechanism that pushes selected objects 130-155 to a desired location via an emitted gaseous stream, or the like. Computing devices 125 may be any computing devices capable of generating a user interface allowing users to select displayed objects 130-155 and categorize them, thereby instructing item manipulation mechanisms 115 to move the selected items to a location designated for the selected item category. Computing devices 125 may be, for example, a computing device such as a tablet computer, a laptop computer, a cellular phone, a desktop computer, or the like. System 100 may categorize any items or objects of any nature, including recyclable items such as glass, plastic, paper, or metal items, as well as non-recyclable items such as construction and demolition debris, other trash, and the like.

In some embodiments, sensors 110, item manipulation mechanisms 115, and computing devices 125 are each in electronic communication with each other and with one or more computers via an electronic communications network 120. As an example, communications network 120 may be a local area network (LAN) in electronic communication with the public Internet, so as to place the system 100 in electronic communication with one or more cloud computing servers.

In operation of an embodiment of system 100, sensors 110 may capture images of objects 130-155 as they pass by on a moving platform such as a conveyor belt 105. Captured images may be video images or still images, and may be transmitted to a remote computing device such as one or more cloud servers, via communications network 120. Alternatively, the captured images may be transmitted to one or more local computing devices. The local or remote computing device or devices may then identify objects 130-155 captured within these images, and transmit the images along with identifications of objects 130-155 to computing devices 125, again via computing network 120. Computing devices 125 may then generate a user interface displaying the received images, with objects 130-155 being user-selectable. The user interface may also allow users to label their selected objects 130-155 as belonging to particular categories, such as by displaying category affordances and allowing users to select, drag, and drop any displayed objects 130-155 into the appropriate affordances or to select displayed objects 130-155 and the appropriate affordance, thus labeling those items as belonging to that particular object category. Item manipulation mechanisms 115 may then direct each categorized item to a location designated for that particular type of item.

In some embodiments, the system 100 is a waste management selection and categorization system, and the objects 130-155 are any recyclable or non-recyclable waste items that can include bottles 130 and 145, cardboard or other paper boxes 135 and 150, metal or other cans 140 and 155, and the like. Accordingly, user interface of computing device 125 displays images of objects 130-155 as they pass by sensor 110 on conveyor belt 105. Users may select individual objects 130-155 from within the images, such as by tapping or touching the objects 130-155 on a touch-sensitive display of computing device 125, by clicking on the objects 130-155 with a mouse, trackball, or the like, or by selecting objects 130-155 in any other manner. Users may then pick a category for the selected objects 130-155, such as by dragging objects 130-155 to a waste category affordance or icon or by selecting the waste category affordance or icon. The selected category may then be transmitted via communications network 120 to item manipulation mechanism 115, instructing mechanism 115 to move the selected object to a location or receptacle designated for items of the selected category. Item manipulation mechanism 115 is shown in FIG. 1A as being a suction-type or bellows gripper mechanism, but it is noted that embodiments of the disclosure contemplate use of any type of manipulation mechanism, such as a claw or any other multi-jaw gripper, an electromagnet, electrostatic force gripper, blowing mechanism, or any other mechanism suitable for manipulation of physical objects.

Figure 1B:
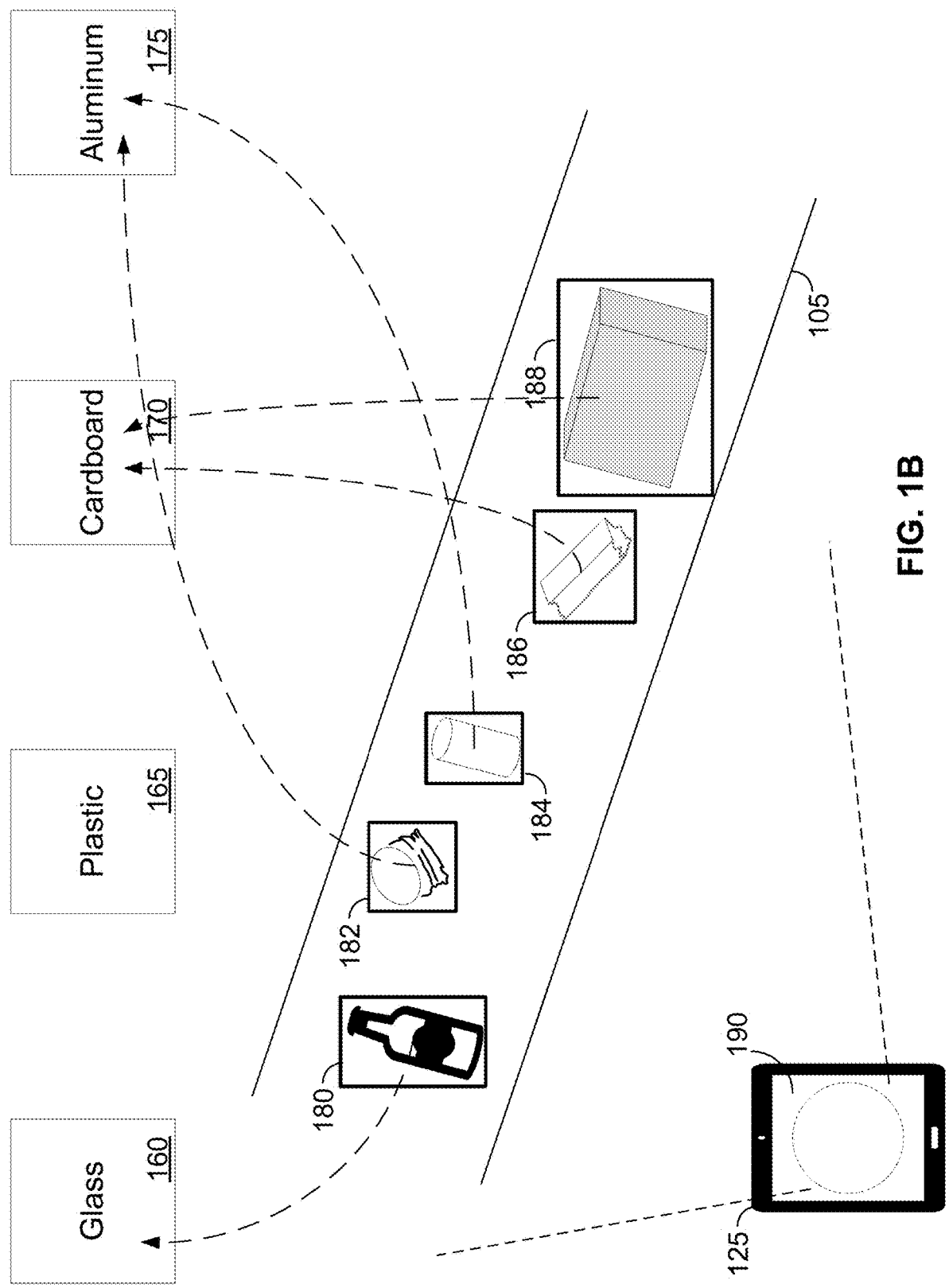
FIG. 1B conceptually illustrates an exemplary user interface for selection and categorization of items, according to embodiments of the disclosure.

FIG. 1B conceptually illustrates an exemplary user interface for selection and categorization of items, according to embodiments of the disclosure. More specifically, FIG. 1B is a magnified view of a portion of display 190 as shown, illustrating operation of an exemplary user interface according to embodiments of the disclosure. The user interface shown includes display of an image captured from sensor 110, in this case a top or plan view of conveyor belt 105 and the objects carried thereon. A cloud server or other computing device identifies the objects in the image, such as by conventional image recognition techniques, and draws a bounding box 180-188 around each. The image area within each bounding box 180-188 is made user selectable. Accordingly, users may select a desired object by selecting any point within the area of its bounding box 180-188, and drag it to an appropriate one of affordances or display icons 160-175 or select an appropriate affordance or display icon, thus labeling the selected object as belonging to that object category.

In exemplary operation of an embodiment of the disclosure, a user may wish to select the leftmost object of FIG. 1B and tag it as belonging to the category "glass." Accordingly, when the display 190 is a touch-sensitive display, the user may touch within bounding box 180 to select the object, and drag it (as shown by the dotted line) to the glass affordance 160, thus labeling the object as being glass. Alternatively, the user may select the object and then select the appropriate affordance. Item manipulation mechanism 115 may then be instructed to, e.g., blow the object to a conveyor belt or bin designated for glass items, pick the item up and deposit it in a receptacle for storing glass, or the like. In some embodiments, the object may be pre-selected before the user drags the object or selects the appropriate affordance.

As another example, the user may touch within bounding box 184 to select the object, e.g., an aluminum can, and drag it to the aluminum affordance 175. Item manipulation mechanism 115 may then be instructed to direct the object to a bin designated for aluminum items. As a further example, the user may recognize that the item within bounding box 182 is, e.g., a crushed or deformed aluminum can. The user may then select it by touching within bounding box 182, and likewise drag it to aluminum affordance 175 or select that affordance. It is noted that conventional object recognition processes are not trained to recognize every possible item shape, and thus may have difficulty in correctly identifying crushed or deformed objects such as that within bounding box 182. This in turn may result in inaccurate identification and sorting, or simply the inability to sort some items. In contrast, human judgment and experience may allow users to more readily recognize the object of bounding box 182 (i.e., object 140) as being an aluminum can deformed into an unconventional shape.

Similarly, users may readily recognize that the item within bounding box 188 is a cardboard or paper box, and may select and categorize it by touching within bounding box 188 and dragging it to cardboard affordance 170 or selecting that affordance. Unlike conventional automated or machine learning approaches, human judgment may also readily recognize that the item within bounding box 186 (i.e., item 150) is, e.g., a crushed or otherwise deformed cardboard box. Users may select this object by touching within bounding box 186 and drag it to cardboard affordance 170 or selecting that affordance. In this manner, embodiments of the disclosure provide an interface allowing for the presence of human judgment in item sorting decisions, thus improving item identification and sorting accuracy.

In some embodiments, system 100 may allow users to select objects that do not have a displayed bounding box. That is, in some embodiments, bounding boxes may not be calculated/displayed, or may be generated for only some objects, e.g., to reduce computational overhead. System 100 may thus identify objects 130-155 without calculating any corresponding bounding boxes, and a user interface of embodiments of the disclosure may allow users to select identified objects such as by simply touching/clicking them. Further, user interfaces of some embodiments may allow users to select and categorize objects not previously identified by system 100, also by simply touching/clicking them. System 100 may then determine the position of the selected object from the location selected within the image and the location of the sensor 110 capturing the image, and instruct item manipulation mechanism 115 to manipulate the item at the determined location to the appropriate location either automatically or in response to the user's categorization.

It is noted that, in some embodiments of the disclosure, system 100 may be implemented in conjunction with conventional manual or automated waste sorting systems. For example, in some embodiments, system 100 may be installed to operate along the same conveyor belt 105 as a conventional waste sorting system, so that the two systems operate simultaneously and in parallel, both sorting the same stream of waste items. In some of these embodiments, system 100 may be placed down the line from the conventional waste sorting system, identifying and sorting items the conventional system may have missed, skipped, or miscategorized. In some other of these embodiments, system 100 may precede the conventional waste sorting system and handle some of the items before subsequent conventional waste sorting. In these manners, system 100 may complement the operation of the conventional waste sorting system, identifying and sorting items that the conventional waste sorting system may have missed, skipped, or perhaps miscategorized or allow for higher throughput. In still some other embodiments, system 100 may utilize at least some components of the conventional waste sorting system. For instance, system 100 may utilize the cameras and item manipulation mechanisms of the conventional waste sorting system instead of sensors 110 and item manipulation mechanisms 115. In some embodiments, software implementing control of system 100 as described herein may be executed by the computing devices of the conventional waste sorting system.

In some embodiments, system 100 may transmit its images of identified objects and their user-determined categories to one or more conventional waste sorting systems, to assist in improving the object recognition and sorting capability of the conventional system. More specifically, such conventional waste sorting systems often employ machine learning models to identify and categorize objects, where such machine learning models must initially be trained using data sets comprising images of various objects each labeled as belonging to specified object categories. For example, training data sets for machine learning models of waste sorting systems may be configured to receive images of various waste objects (e.g., boxes, cans, bottles, paper, and other items) labeled as belonging to appropriate categories for corresponding management or disposal (e.g., paper products including any products made from plant-based or textile-derived fibers, glass, plastic, metal including aluminum or ferrous metal products, non-recyclable waste, etc.). Any categories may be employed, including without limitation categories for any of the items described above, as well as categories for any other items such as plastic bags, any household products such as diapers, compostables, any other recyclable items, any non-recyclable items, or the like.

Once users of system 100 categorize objects 130-155, the images of categorized objects, such as the image portions within bounding boxes 180-188, may have their user-specified categories 160-175 associated therewith. These images and their associated categories may then be transmitted from computing device 125, or another computer such as a server computer accessed via electronic communications network 120, to one or more computing devices of a conventional waste sorting system, to be added to their training data set as labeled images of objects. The machine learning models of the conventional waste sorting system may then be re-trained using this augmented training set, thus allowing the human-identified images from system 100 to improve the machine learning models of conventional sorting systems.

Figure 2:
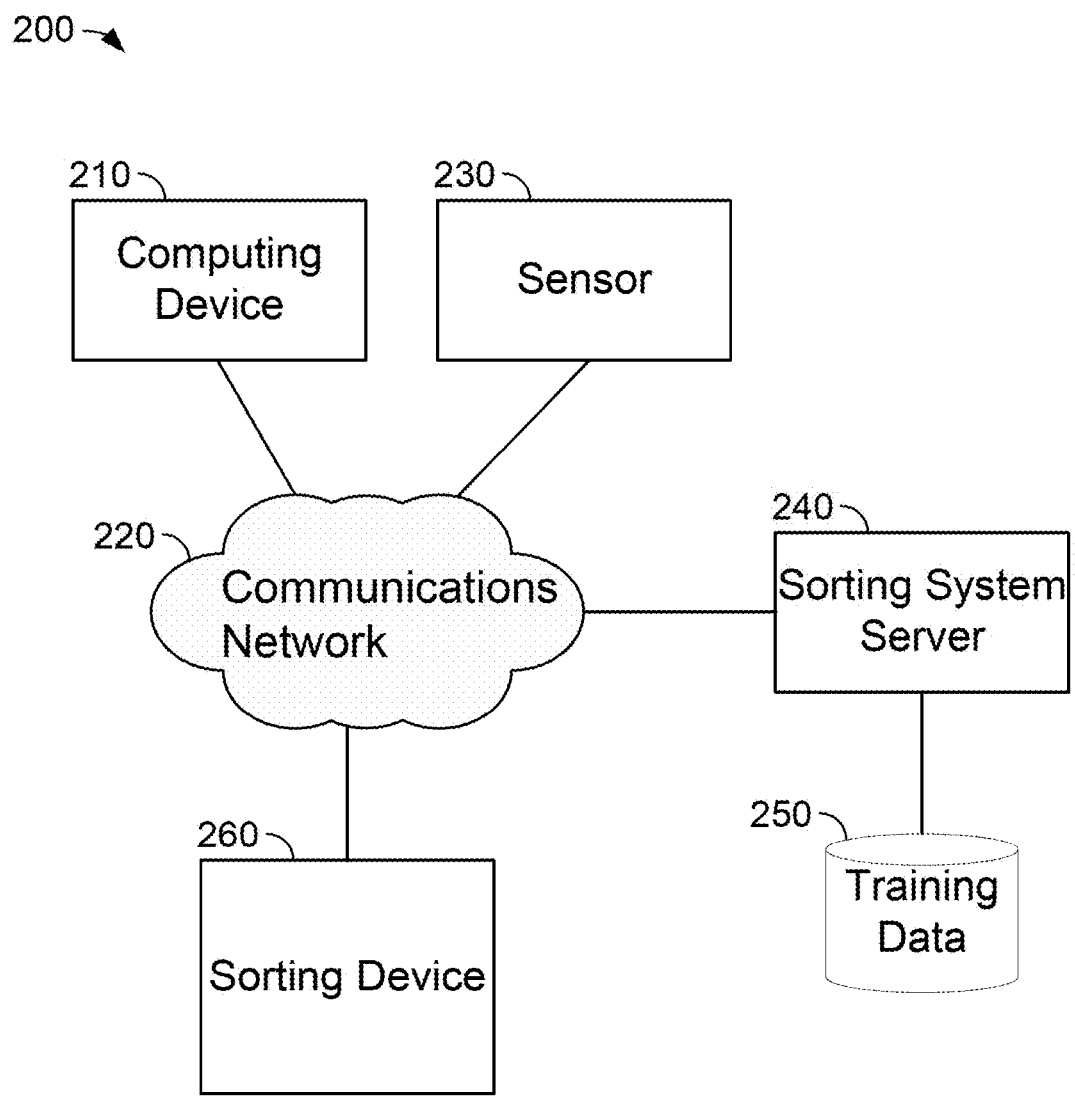
FIG. 2 is a block diagram representation of an exemplary system of FIGS. 1A-1B.

FIG. 2 is a block diagram representation of an exemplary system of FIGS. 1A-1B. System 200, which may be a block diagram representation of system 100, may include one or more computing devices 210, as well as any number of sensors 230 and sorting devices 260, all of which are in electronic communication with a sorting system server 240 and storage 250 through a communication medium such as a communications network 220. In some embodiments of the disclosure, computing device 210 may correspond to computing device 125, each sensor 230 may correspond to a sensor 110, and each sorting device 260 may correspond to item manipulation mechanism 115, while communications network 220 may correspond to communications network 120 and/or another electronic communications network in electronic communication therewith, such as the public Internet.

In operation of system 200, each sensor 230 captures images of objects on conveyor belt 105, and transmits them to sorting system server 240 via communications network 220. Sorting system server 240 may then identify objects within the captured images, as well as supplementary information such as the size and position of a bounding box for each identified object. The images and their supplementary information are then transmitted to computing device 210 via communications network 220, which generates a user interface on its display. As above, the user interface includes the received images and supplementary information, e.g., the user interface displays a live feed of the received images with the bounding boxes overlaid on corresponding identified objects. The user interface may designate areas within each bounding box as user-selectable areas, and may also display affordances 160-175 or provide any other visual indicators allowing users to categorize items within each bounding box.

Computing device 210 transmits user selections of items and corresponding item categories back to sorting system server 240 again via communications network 220, which instructs sorting devices 260 to move the selected objects to locations corresponding to their identified categories.

In some embodiments, sorting system server 240 may identify objects within images, and determine bounding boxes therefor, using one or more machine learning models. Training of these machine learning models may be performed using a training set of images that is stored in storage 250. Object images categorized by users via computing device 210 may be added to this training set and stored in storage 250, so that object identification and categorization machine learning models may be re-trained using the training data sets of storage 250 as they are updated. In this manner, object identification and categorization processes of embodiments of the disclosure may be constantly improved as users identify and categorize objects. Similarly, in some embodiments of the disclosure, object images categorized by users via computing device 210 may be transmitted to conventional object identification and sorting systems to improve their training datasets.

As above, in some embodiments, system 100 may be placed down the line from a conventional waste sorting system, and may operate to identify and sort items the conventional system may have missed, skipped, or mis-categorized. In some embodiments, system 100 may operate entirely downstream from one or more conventional waste sorting systems, detecting, identifying, and classifying items that have passed through the conventional system. In some other embodiments, system 100 may operate entirely upstream from one or more conventional waste sorting systems. In some other embodiments, system 100 may be partially integrated into the conventional waste sorting system, to allow users to correct mis-categorizations of the conventional system. Computing device 125 or any other computing resources of system 100 may be in electronic communication with the conventional waste sorting system to receive item categorizations determined by the conventional system, and may display these categorizations along with real-time images of items captured by the conventional system. For example, similar to the above, system 100 may display each item with a bounding box or other information indicating the conventional system's categorization. The computing device 125 may then operate as above, displaying a user interface as in FIG. 1B allowing users to select objects 130-155 for categorization. In embodiments such as these, the object categories may be determined by the conventional system or optionally by a trained system as described herein, and users may choose to only select those objects 130-155 which the conventional system has categorized in error, e.g., mis-categorized, failed to categorize, or the like. Accordingly, users may select objects 130-155 which they believe to be erroneously categorized, and select a more appropriate category 160-175. Object selection and re-categorization may be performed in any suitable manner, such as by touching/clicking the object 130-155 and dragging it to the appropriate category 160-175, tapping the object 130-155 to select it and subsequently tapping the appropriate category 160-175, or the like. In some embodiments, system 100 may also allow users to un-select wrongly-categorized objects, or otherwise indicate that a particular object does not fall under a specified category. For example, system 100 may allow users to pick a categorized object in a manner that indicates de-selection (e.g., double click/tap resets the object to uncategorized status). As another example, system 100 may offer an affordance for items that do not fall under any other category, where users may drag items to this affordance to remove their categorization or otherwise label them as uncategorized. Objects having no categorization may be handled in any desired manner, such as by direction to a bin designated for uncategorized items, destruction, disposal, simply allowing them to pass through system 100, or the like.

Re-categorizations may then be transmitted to a computing device of the conventional system, to allow the conventional system to manipulate the re-categorized object as appropriate, e.g., to manipulate it to the proper bin or the like. For example, System 100 may also transmit images of the re-categorized objects 130-155 to the conventional system for use as training images, allowing the conventional system to be re-trained with user-categorized images to improve its accuracy. In this manner, embodiments of the disclosure provide a system that complements conventional sorting systems, providing users an easy-to-use display for visually detecting errors made by conventional sorting systems and quickly and easily correcting them.

Figure 3:
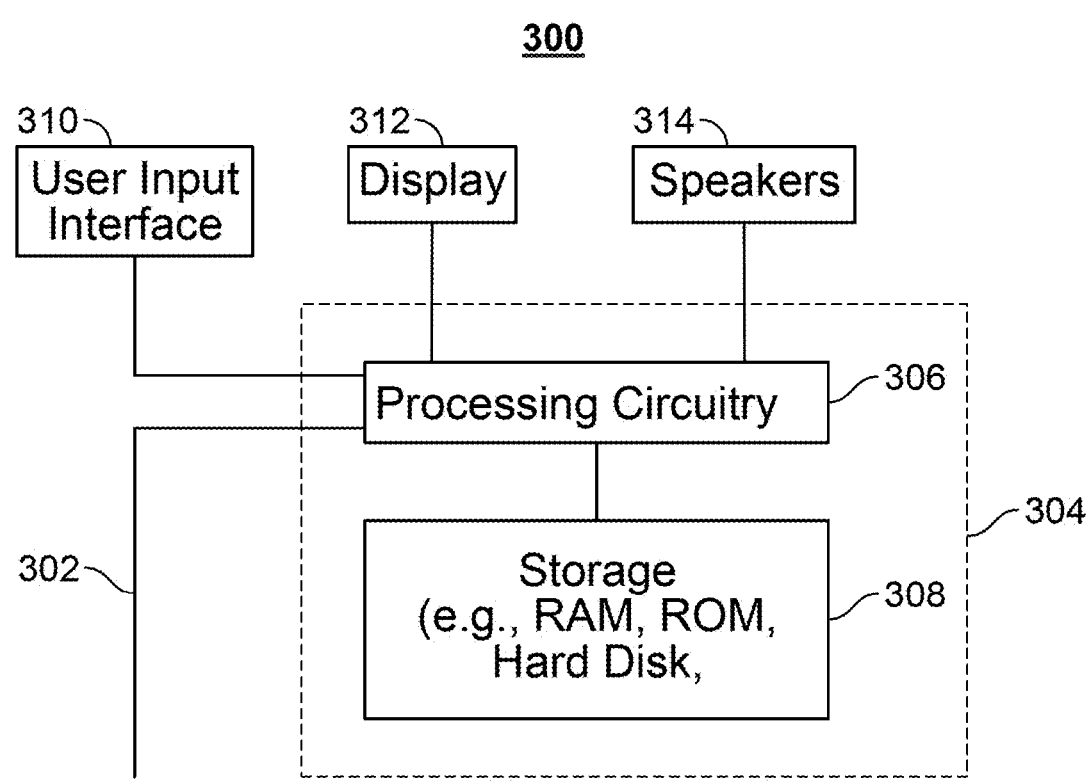
FIG. 3 is a generalized embodiment of an exemplary computing device suitable for use with embodiments of the disclosure.

FIG. 3 is a generalized embodiment of an exemplary computing device suitable for use with embodiments of the disclosure. Here, computing device 300 may be an embodiment of computing device 210 of FIG. 2. Computing device 300 may receive instructions and data via input/output (I/O) path 302. I/O path 302 may provide instructions and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), SoCs, etc., and may include a single or multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an ARM MO processor). In some embodiments, control circuitry 304 executes instructions for executing application programs including user interface programs described herein for user selection and categorization of objects.

Control circuitry 304 may also include communications circuitry suitable for communicating with sorting system server 240 or other networks or servers, whether local, remote, cloud-based, or the like. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of any computing devices, or communication of computing devices in locations remote from each other.

Memory may be an electronic storage device provided as storage 308 that is part of control circuitry 304. As referred to herein, storage should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of data, such as instructions for implementing the above described user interface, cached images, bounding box data, images and associated categories, and the like. Nonvolatile memory such as but not limited to Flash memory may also be used (e.g., to launch a boot-up routine and other instructions). Cloud-based storage may be used to supplement storage 308 or instead of storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, smart phone, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, display for a personal computer, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images and product shopping lists. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

Figure 4:
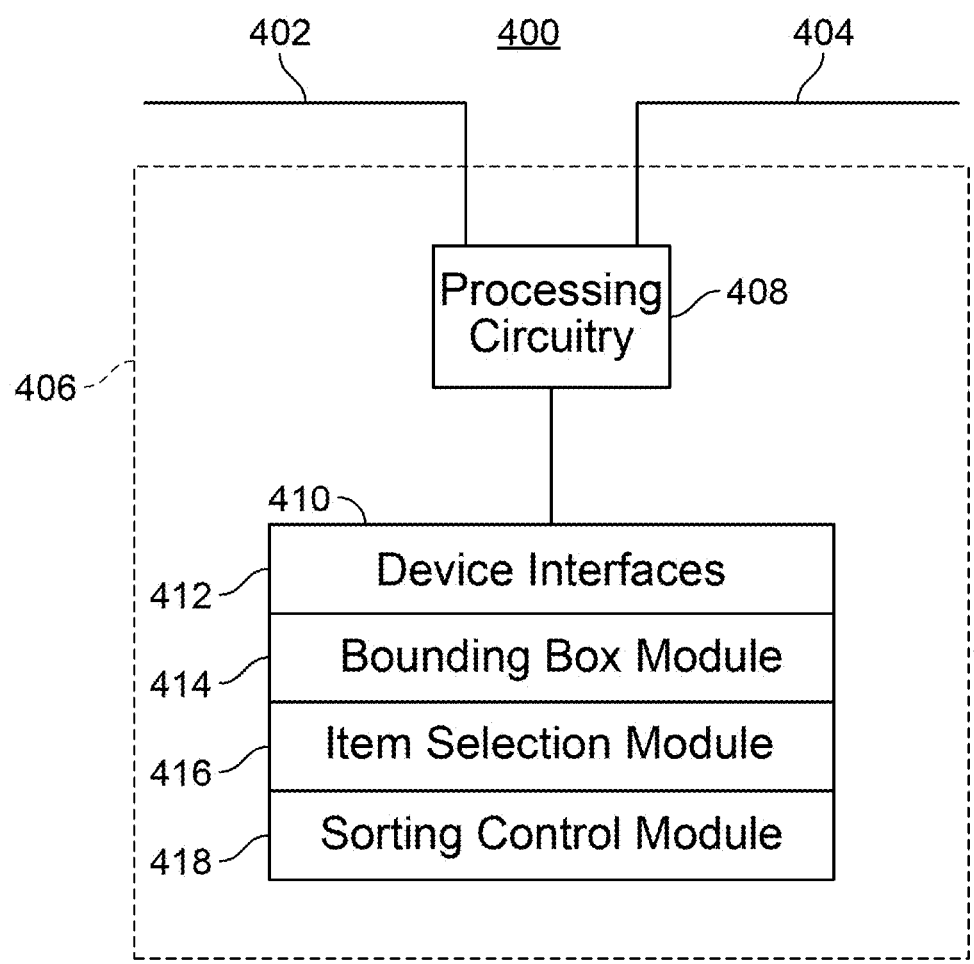
FIG. 4 is a generalized embodiment of an exemplary server computer suitable for use with embodiments of the disclosure.

FIG. 4 is a generalized embodiment of an exemplary server computer suitable for use with embodiments of the disclosure.

Here, device 400 may be an embodiment of a sorting system server 240, and in some embodiments may implement object identification and sorting processes described herein. Device 400 may receive content and data via I/O units 402 and 404. I/O unit 402 may receive images from sensors 230 and may transmit instructions thereto for control of sensor operation. I/O unit 404 may provide data to, and receive content from, one or more sorting devices 260 as well as, e.g., computing devices 210. Like the computing device 300, the device 400 has a processor 408 or processing circuitry, and storage 410. The processor 408 and storage 410, along with I/O units 402 and 404, are in electronic communication with each other via a communications medium such as a bus. The processor 408 and storage 410 may be constructed, and may operate, in similar manner to the respective components of device 300.

Storage 410 is a memory that stores a number of programs for execution by processing circuitry 408. In particular, storage 410 may store one or more object identification and categorization programs that may include device interfaces 412, a bounding box module 414, an item selection module 416, and a sorting control module 418. The device interfaces 412 are interface programs for handling the exchange of commands and data with the sensors 230, computing devices 210, and sorting devices 260. Bounding box module 414 includes one or more programs for identifying objects in images, and drawing bounding boxes around each. Programs for drawing bounding boxes around images are known, and embodiments of the disclosure contemplate use of any such programs and methods. Item selection module 416 includes one or more programs for identifying and categorizing objects in images. Embodiments of the disclosure contemplate any programs for identifying and categorizing objects according to any methods or processes. In some embodiments of the disclosure, such programs employ any one or more image processing methods and/or any one or more machine learning models configured or configurable for receiving images as an input, and generating object boundaries and, if desired, object classifications as outputs. Embodiments of the disclosure contemplate use of any one or more machine learning models capable of generating such outputs from input images, including without limitation convolutional neural networks (CNNs) and other types of deep neural networks (DNNs), Iterative Self-Organizing Data Analysis Technique (ISODATA) models, K-means and other suitable clustering models, and the like. Sorting control module 418 includes one or more programs for associating object categories with corresponding images, such as by generating and appending metadata to images of objects. Any approaches to association of images with object categories is contemplated. Sorting control module 418 programs may also direct sorting devices 260 to sort categorized objects, such as by directing sorting devices 260 to move items to corresponding locations designated for objects of those categories.

One of ordinary skill in the art will appreciate that any one or more of these modules or sets of instructions may reside on, and be executed by, any suitable electronic computing device. For example, any one or more of programs 414-418 may reside on and be executed by device 400 as shown, or may reside on and be executed by a computing device 210, e.g., device 300, instead.

The device 400 may be any electronic device capable of performing object identification and sorting operations described herein. For example, the device 400 may be a server computer located proximate to the sensors 230, e.g., within the same waste management facility. Alternatively, the device 400 may be a remote device such as a cloud server. The device 400 may alternatively be a laptop computer or desktop computer configured as above.

Figure 5:
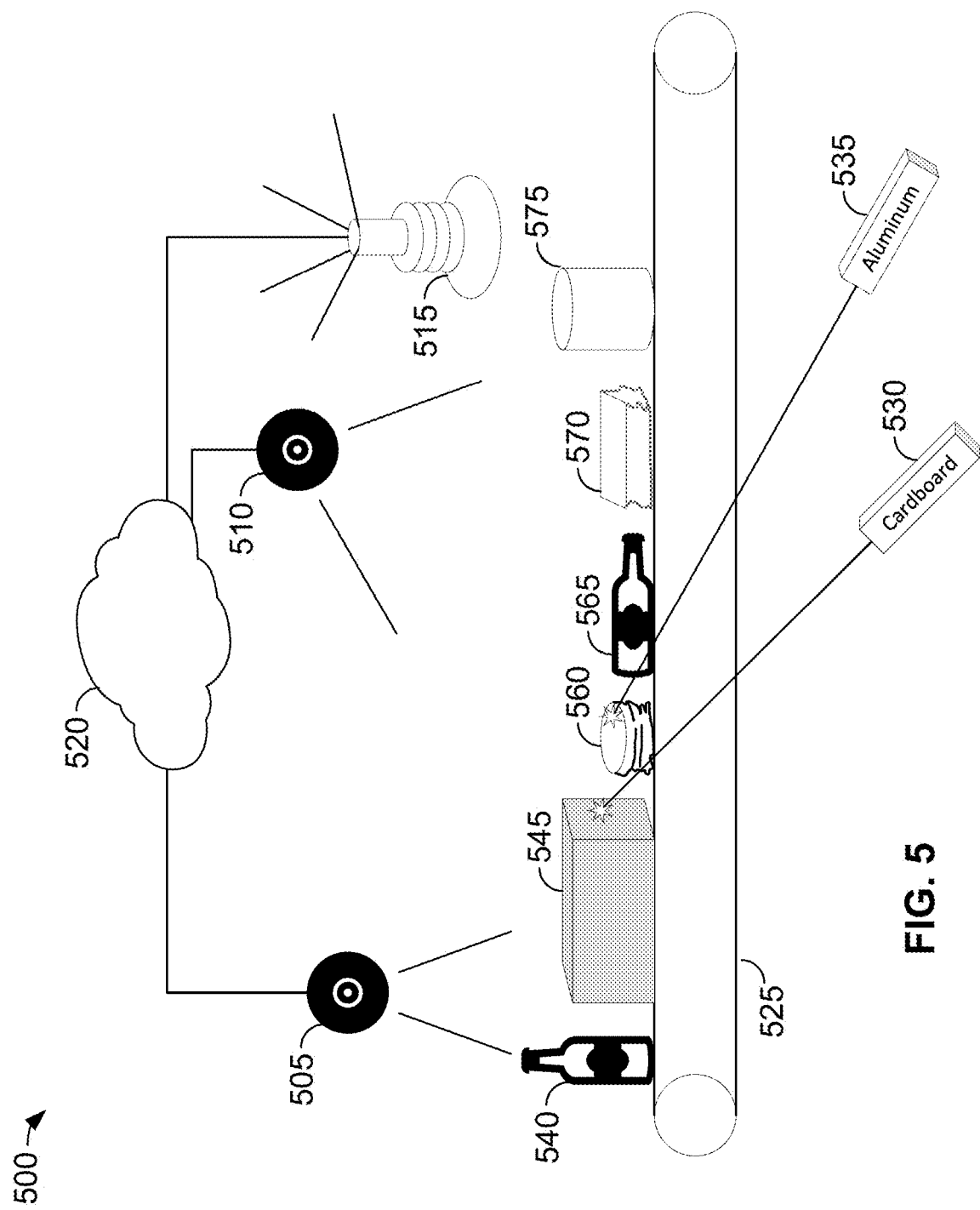
FIG. 5 is a diagram conceptually illustrating a further exemplary system for selection and categorization of items, according to embodiments of the disclosure.

FIG. 5 is a diagram conceptually illustrating a further exemplary system for selection and categorization of items, according to embodiments of the disclosure. Here, item sorting system 500 includes multiple sensors 505, 510, one or more item manipulation mechanisms 515, and one or more light sources 530, 535. The sensors 505, 510 and item manipulation mechanisms 515 may each be placed in electronic communication with a computing device (not shown) via electronic communications network 520. The sensors 505, 510 and item manipulation mechanisms 515, electronic communications network 520, and computing device may be similar in configuration and operation to corresponding components described in connection with FIGS. 1A and 1B above. Light sources 530, 535 may be any light source capable of generating light having directable light beams with detectable reflection, such as a laser generator. Users may direct light sources 530, 535 onto specific objects 540-575 on conveyor belt 525, to identify them as belonging to specific object categories.

In operation of an embodiment of system 500, light sources 530, 535 may be used to identify particular objects as belonging to specified object categories, and item manipulation mechanisms 515 may move these items to locations designated for those specified categories. As an example, each light source 530, 535 may be designated for identification of only a specific, predetermined category of items, e.g., light source 530 may be designated for cardboard items only, and light source 535 may be designated for identification of aluminum items only. To identify a specific category of items, each light source 530, 535 may have associated therewith a predetermined unique identifier or identifying characteristic, so that objects identified with that particular light source may always be associated with the category of that light source. As an example, in some embodiments, each light source 530, 535 may emit light of a predetermined unique frequency or color. In this manner, sensors 505, 510 may capture an image of an object 540-575 with a reflected light spot having a specific frequency/color. System 500 may then be trained to identify reflected light spots having that specific frequency/color, and associate certain object categories with those objects. For instance, light source 530 may be a red light laser, while light source 535 may be a blue light laser, and server 240 may store a table associating red light illumination with cardboard, and blue light illumination with aluminum. Accordingly, system 500 may recognize objects having a red dot or illumination spot, such as object 545, as being cardboard, and may recognize objects having a blue laser reflection spot, such as object 560, as being aluminum. System 500 may then categorize objects as described above, moving these categorized items to locations such as bins containing specific categories of objects.

In some embodiments, light sources 530, 535 may each emit a unique predetermined spatial light pattern, or temporal light pattern, which serves as a unique identifier. System 500 may then be trained to associate objects having these particular light patterns as belonging to corresponding object categories. Embodiments of the disclosure contemplate any form of unique identifier allowing for categorization of objects by illumination from a particular light source.

Figure 6:
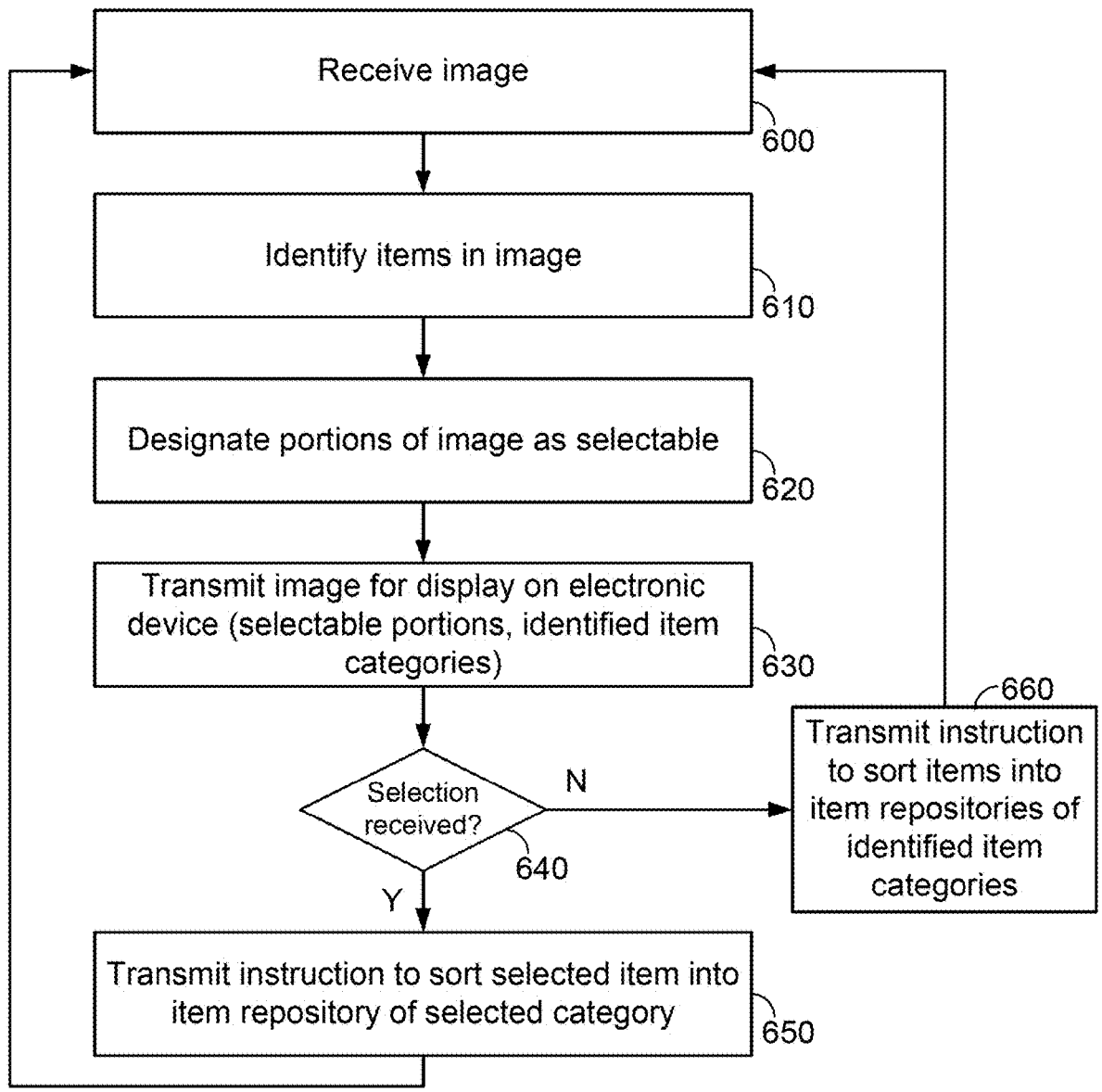
FIG. 6 is a flow chart depicting a method for selecting and categorizing items, according to embodiments of the disclosure.

FIG. 6 is a flow chart depicting a method for selecting and categorizing items, according to embodiments of the disclosure. In some embodiments of the disclosure, a sensor such as sensor 230 captures an image of a collection of objects, such as objects on a moving conveyor belt, and transmits this image to a computing device such as server 240 for analysis. The image is received at server 240 (Step 600), which then identifies objects or items captured therein (Step 610). As above, items may be identified via conventional image recognition techniques, via use of one or more machine learning models, or in any other suitable manner. The identified objects may then be designated as user selectable (Step 620), which may include calculating or otherwise determining a bounding box surrounding each object, and identifying one or more objects as belonging to certain object categories. In some embodiments, objects may be provisionally identified such as by the above described object categorization methods or in any other suitable manner, even though users may subsequently re-categorize these objects themselves via methods described herein.

The image with its designated selectable portions, bounding boxes, provisional object categorizations, etc., may then be transmitted for display to users on an electronic device such as computing device 210 (Step 630). As above, display of this image may be carried out using a user interface generated on the display of computing device 210, which displays the image in a manner allowing users to select various objects therein. In some embodiments, the image may be displayed and the previously determined bounding boxes may be generated around their respective objects, with the image portions within these bounding boxes being user selectable. Provisional object categorizations may also be displayed when they exist, and may be, e.g., displayed within or proximate to their corresponding bounding boxes. These provisional categorizations, when present, may act as nonbinding suggestions for the user, who may skip these objects and thus retain the provisional object categorization by default, or may select such objects and re-categorize them when desired. In some embodiments, automated provisional object categorization may be inaccurate, and users may select and re-categorize these objects to correct these inaccuracies.

Affordances or other indicia of object categories may also be displayed within the user interface. In this manner, users may select objects (e.g., touch those image portions lying within bounding boxes surrounding those objects or, for those objects for which no bounding box has been calculated/displayed, touch those image portions lying within object edges), and select an object category for the selected object (e.g., drag the image portions to the appropriate affordance). Computing device 210 may check to determine whether a user selection was performed (Step 640), e.g., whether an object was touched and dragged to an object category or an object category was selected. Once device 210 receives an object and its categorization, it may transmit this information to server 240, which in turn may transmit instructions directing sorting device 260 to sort the selected item, such as by manipulating the object into an item repository for objects of that category (Step 650). If at Step 640 no user selection is received, i.e., if the object moves outside of the captured images without a user categorization, server 240 may sort the object according to its existing provisional categorization. That is, server 240 may transmit instructions to sort items not categorized by the user into item repositories designated for those provisional categories (Step 660). The process of FIG. 6 may then repeat for further images containing the same or other objects. Additionally, object images and corresponding user categorizations may be stored at server 240 or transmitted to another computing device, for addition to a training data set to re-train and improve object identification machine learning models.

Figure 7:
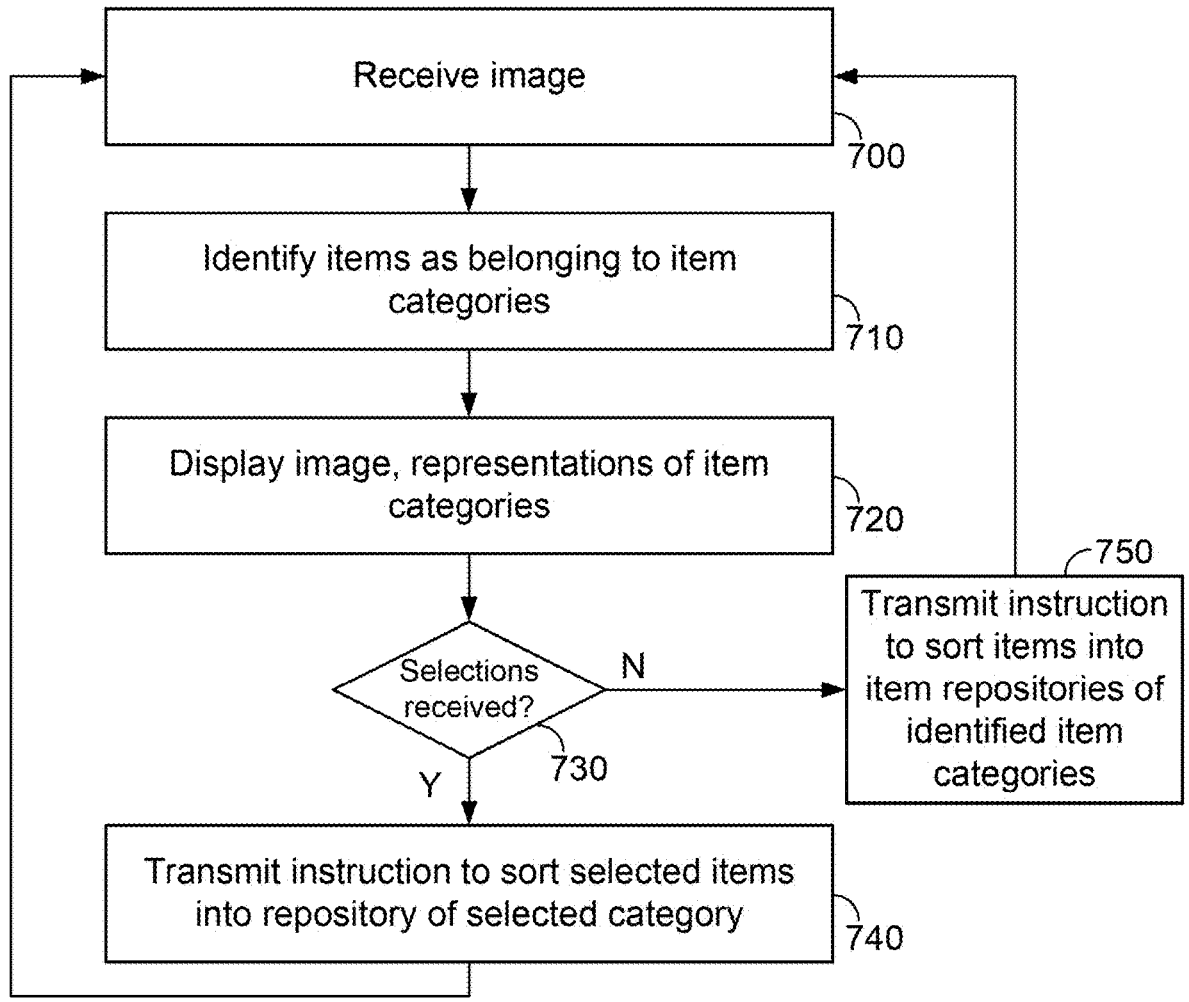
FIG. 7 is a flow chart depicting a method for selecting and categorizing items, according to further embodiments of the disclosure.

FIG. 7 is a flow chart depicting a method for selecting and categorizing items, according to further embodiments of the disclosure. In contrast to FIG. 6, various steps of the process of FIG. 7 may be performed by computing device 210, rather than sorting system server 240. That is, any object identification and sorting steps of embodiments of the disclosure may be performed by either a local device such as computing device 210, or by a remote device such as sorting system server 240. FIG. 7 illustrates an embodiment in which many steps of FIG. 6 are performed by computing device 210 instead of sorting system server 240. Sorting system server 240 may thus be omitted, with its functions instead performed by computing device 210.

In some embodiments of the disclosure, a sensor such as sensor 230 may capture an image of one or more objects, and transmit this image to a computing device 210 for analysis. The image is received at computing device 210 (Step 700), which then identifies objects or items and categorizes them (Step 710). As above, items may be identified via conventional image recognition techniques, via use of one or more machine learning models, or in any other suitable manner. The identified objects may then be designated as user selectable, which may include calculating or otherwise determining a bounding box surrounding each object. In some embodiments, objects may be provisionally identified such as by the above described object categorization methods or in any other suitable manner, even though users may subsequently re-categorize these objects themselves via methods described herein.

The image with its designated selectable portions, bounding boxes, provisional object categorizations, etc., may then be displayed to users on the display of computing device 210 (Step 720). As above, display of this image may be carried out using a user interface generated on the display of computing device 210, which displays the image in a manner allowing users to select various objects therein. In some embodiments, the image may be displayed and the previously determined bounding boxes may be generated around their respective objects, with the image portions within these bounding boxes being user selectable. Provisional object categorizations may also be displayed when they exist, and may be, e.g., displayed within or proximate to their corresponding bounding boxes. These provisional categorizations, when present, may act as nonbinding suggestions for the user, who may skip these objects and thus retain the provisional object categorization by default, or may select such objects and re-categorize them when desired. In some embodiments, automated provisional object categorization may be inaccurate, and users may select and re-categorize these objects to correct these inaccuracies.

Affordances or other indicia of object categories may also be displayed within the user interface. In this manner, users may select objects (e.g., touch those image portions lying within bounding boxes surrounding those objects or, for those objects for which no bounding box has been calculated/displayed, touch those image portions lying within object edges), and select an object category for the selected object (e.g., drag the image portions to the appropriate affordance). Computing device 210 may check to determine whether a user selection was performed (Step 730), e.g., whether an object was touched and dragged to an object category. Once device 210 receives an object and its categorization, it may transmit instructions directing sorting device 260 to sort the selected item, such as by manipulating the object into an item repository for objects of that category (Step 740). In some embodiments, device 210 may also, or alternatively, transmit instructions to other entities, such as multiple sorting devices 260, or to human users tasked with manually sorting objects. In some embodiments, transmitted instructions may include information such as item identifiers and associated categories for those items, to inform human users of which items to sort, and how to sort them.

If at Step 730 no user selection is received, i.e., if the object moves outside of the captured images without a user categorization, device 210 may sort the object according to its existing provisional categorization. That is, device 210 may transmit instructions to sort items not categorized by the user into item repositories designated for those provisional categories (Step 750). The process of FIG. 7 may then repeat for further images containing the same or other objects. Additionally, object images and corresponding user categorizations may be stored at device 210, server 240, or transmitted to another computing device, for addition to a training data set to re-train and improve object identification machine learning models.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, any of the process steps of any embodiments of the disclosure may be performed by a local computing device or a remote computing device, as desired. Any objects or items may be identified in any manner, and designated as belonging to any desired categories. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method, comprising:
   receiving an image of a plurality of items;
   transmitting the image for display on an electronic device, the display including the image and a visual representation of each of one or more item categories;
   receiving, from the electronic device, a selection of one of the image portions and a selection of one of the item categories from an input to the electronic device; and
   transmitting an instruction to sort the item corresponding to the selected one of the image portions into a repository of items of the selected item category.

2. The method of claim 1, further comprising:
   identifying the items as each belonging to one of the item categories, so as to determine an identified item category for each item; and
   transmitting each identified item category for display on the electronic device in association with the corresponding item.

3. The method of claim 1, further comprising:
   associating the received selections of the item categories with the corresponding image portions, so as to form labeled images of ones of the plurality of items; and
   appending the labeled images of ones of the plurality of items to a training data set for training one or more machine learning models, the one or more machine learning models having images of the items as inputs, and having as outputs corresponding ones of the item categories for each input item.

4. The method of claim 3, further comprising:
   after the appending, training the one or more machine learning models using the labeled images of the training data set.

5. The method of claim 1, wherein the items comprise one or more of recyclable items or non-recyclable items.

6. The method of claim 1, wherein one or more item categories comprise glass, plastic, paper, or metal.

7. The method of claim 1, further comprising designating portions of the image corresponding to the items as being selectable portions, wherein the transmitting the image for display further comprises transmitting the selectable portions of the image for display on the electronic device, the display including the selectable portions of the image.

8. An electronic device, comprising:
   one or more processors;
   memory; and
   one or more programs stored in memory, the one or more programs including instructions for:
   receiving an image of a plurality of items;
   transmitting the image for display on another electronic device, the display including the image and a visual representation of each of one or more item categories;
   receiving, from the another electronic device, a selection of one of the image portions and a selection of one of the item categories from an input to the another electronic device; and
   transmitting an instruction to sort the item corresponding to the selected one of the image portions into a repository of items of the selected item category.

9. The electronic device of claim 8 further comprising instructions for:
   identifying the items as each belonging to one of the item categories, so as to determine an identified item category for each item; and
   transmitting each identified item category for display on the electronic device in association with the corresponding item.

10. The electronic device of claim 8 further comprising instructions for:
    associating the received selections of the item categories with the corresponding image portions, so as to form labeled images of ones of the plurality of items; and
    appending the labeled images of ones of the plurality of items to a training data set for training one or more machine learning models, the one or more machine learning models having images of the items as inputs, and having as outputs corresponding ones of the item categories for each input item.

11. The electronic device of claim 10, further comprising instructions for:
    after the appending, training the one or more machine learning models using the labeled images of the training data set.

12. The electronic device of claim 8, wherein the items comprise one or more of recyclable items or non-recyclable items.

13. The electronic device of claim 8, wherein one or more item categories comprise glass, plastic, paper, or metal.

14. The electronic device of claim 8 further comprising instructions for designating portions of the image corresponding to the items as being selectable portions, wherein the transmitting the image for display further comprises transmitting the selectable portions of the image for display on the electronic device, the display including the selectable portions of the image.

15. A non-transitory computer-readable storage medium storing one or more programs, the one or more programs comprising instructions, which when executed by one or more processors of an electronic device, cause the electronic device to:
    receive an image of a plurality of items;
    transmit the image for display on another electronic device, the display including the image and a visual representation of each of one or more item categories;

receive, from the another electronic device, a selection of one of the image portions and a selection of one of the item categories from an input to the another electronic device; and transmit an instruction to sort the item corresponding to the selected one of the image portions into a repository of items of the selected item category.

\* \* \* \* \*